United States Patent [19]
Schirle et al.

[11] Patent Number: 5,623,823
[45] Date of Patent: Apr. 29, 1997

[54] VARIABLE CYCLE ENGINE WITH ENHANCED STABILITY

[75] Inventors: Steven M. Schirle, Boynton Beach; Samy Baghdadi, Palm Beach Gardens; Syed J. Khalid, Palm Beach Gardens; Gary M. Perkins, Palm Beach Gardens, all of Fla.

[73] Assignee: United Technologies Corporation, East Hartford, Conn.

[21] Appl. No.: 568,039

[22] Filed: Dec. 6, 1995

[51] Int. Cl.⁶ .................................................. F02K 3/02
[52] U.S. Cl. .......................... 60/226.3; 60/262; 415/20; 415/144; 415/160
[58] Field of Search .................... 60/226.1, 226.3, 60/262, 263; 415/20, 144, 160, 161

[56] References Cited

U.S. PATENT DOCUMENTS

| | | | |
|---|---|---|---|
| 3,887,297 | 6/1975 | Welchek | 415/161 |
| 4,010,608 | 3/1977 | Simmons | 60/226.3 |
| 4,741,665 | 5/1988 | Hanser | 415/161 |
| 4,791,783 | 12/1988 | Neitzel | 60/262 |
| 5,311,736 | 5/1994 | Lardellier | 60/226.3 |
| 5,404,713 | 4/1995 | Johnson | 60/226.3 |

FOREIGN PATENT DOCUMENTS

| | | |
|---|---|---|
| 1596420 | 7/1970 | France. |
| 2284059 | 2/1976 | France. |

*Primary Examiner*—Charles G. Freay
*Attorney, Agent, or Firm*—Kenneth C. Baran

[57] ABSTRACT

A variable cycle gas turbine engine (10) includes a core unit (30) having a guide vane array (36), and a hybrid stage (38) with a rotor blade array (40) and a stator vane array (42). The engine is operable in at least two modes which channel different quantities of working medium air to the core unit, and each mode corresponds to a distinct thermodynamic cycle. The vanes (54) of the hybrid stage stator vane array are bivariable so that the leading segment (140) and trailing segment (146) of each vane are separately adjustable over a range of pitch angles. The bivariable character of the vanes ensures aerodynamic stability of the engine in each of its modes of operation.

7 Claims, 5 Drawing Sheets

VARIABLE CYCLE ENGINE WITH ENHANCED STABILITY

TECHNICAL FIELD

This invention relates to variable cycle gas turbine engines and more particularly to an engine having a hybrid stage with stability enhancing bivariable stator vanes.

BACKGROUND OF THE INVENTION

Aircraft gas turbine engines operate throughout an extensive operating envelope of altitudes, flight speeds and power settings. The widely varying operational conditions within the operating envelope impose differing, and sometimes conflicting demands on an engine. Therefore, engines are typically designed to exhibit peak performance within that portion of the operating envelope where the engine will be operated most frequently, with the consequence that engine performance is suboptimal at other conditions. It is also common practice to employ mechanical devices, such as variable pitch blades and vanes, as well as sophisticated control strategies to maximize the portion of the operating envelope over which engine performance will be at or near optimum. However these devices and strategies do not alter the fundamental thermodynamic cycle of the engine, and therefore cannot produce uniformly optimum performance throughout the entire operating envelope. Because such engines are based on a single thermodynamic cycle, they are categorized as single cycle engines. Most modern commercial engines are good examples of single cycle engines—they exhibit excellent fuel efficiency at cruise conditions (high altitude, high subsonic airspeed, moderate engine power) where most of the engine's operation occurs but may offer poorer fuel economy at other operating conditions where the engine spends relatively little of its operational life.

Variable cycle engines represent another approach to accommodating the variation of conditions within an engine's operating envelope. A variable cycle engine is operable in any of two or more modes, each of which corresponds to a distinctly different thermodynamic cycle. Each mode is customized to achieve the best possible performance within a portion of the operating envelope. For example, a carrier based military aircraft may require an engine with high specific thrust (thrust per unit airflow or thrust per unit frontal area) for limited duration bursts of power during takeoff, while also requiting good fuel economy to maximize the aircraft's combat radius. If a single cycle engine cannot satisfy both requirements, and neither requirement can be relaxed, a variable cycle engine may be able to satisfy the conflicting demands.

The cycle variability of a variable cycle engine is often achieved with systems of external doors which open or close to expose or block auxiliary air inlets or exhaust ports. Additionally or alternatively, internal doors or valves may open or close to reroute airflow within the engine. The operation of these systems must be carefully coordinated with the operation of other engine systems to ensure proper engine operation in each mode and smooth, trouble free transition between modes. Obviously, the disadvantages of a variable cycle engine include the complexity, weight and cost associated with these systems and their operation. The disadvantages are acceptable only if the engine satisfies the performance demands imposed upon it in all of its operational modes.

The present invention is concerned with a variable cycle engine in which internal valves redirect the flow of air within the engine to achieve multimodal operation. In one mode of operation, referred to as the low mode, the engine operates much like a conventional turbofan engine. Air drawn into the engine intake flows through a fan and then is split into coannular streams. One stream flows into a fan duct while the other is channeled into a core unit which includes a variable pitch guide vane array, a hybrid compression stage having a rotor blade array and a variable pitch stator vane array, and a core compressor. The streams are reunited at an internal mixing plane at the aft end of the fan duct and the reunited stream is discharged through an external exhaust nozzle. In this mode the engine produces sufficient specific thrust for cruise operation, exhibits low fuel consumption and operates at moderate internal temperatures. In another mode of operation, referred to as the high mode, airflow from the fan is blocked from entering the fan duct and instead is channeled to the engine's core unit and through the guide vane array. Upstream of the compressor, the air stream is split into two streams, one of which enters the compressor and the other of which flows through a compressor bypass port and into the fan duct. In the high mode the engine produces greater specific thrust than in the low mode, but does so at the expense of increased fuel consumption and elevated internal temperatures.

One shortcoming of the above described variable cycle engine is related to the difference in the quantity (mass flow per unit time) of air channeled into the core unit in each of the described modes. In the high mode, the vanes of the guide vane array are oriented at an open pitch angle to accommodate the large quantity of air channeled to the core unit. The vanes of the hybrid stage stator vane array are likewise oriented at an open pitch angle so that the incidence angle between the leading edges of the hybrid vanes and the local flow direction of the air stream is within a range of incidence angles that produces aerodynamically stable operation of the vanes. The open vane orientation also guarantees that the flow area of the hybrid vane array (i.e. the aggregate area of the intervane flow passages) is sufficient to accommodate the large quantity of air from the fan. When the engine is operated in the low mode, a significantly smaller quantity of air is channeled into the core unit at a correspondingly lower velocity. The guide vanes are oriented at a more closed pitch angle which is compatible with the reduced air velocity. The hybrid vanes are also oriented at a more closed pitch angle so that the incidence angle, which is affected by the reduction in velocity, remains within the range of aerodynamic stability. Unfortunately, the closed pitch angle also reduces the flow area of the hybrid vane array, constricting its flow capacity. The reduction in flow capacity exceeds the reduction in the quantity of air channeled to the core unit in the low mode (relative to the high mode). As a result, the air pressure downstream of the hybrid rotor blade array becomes elevated and makes the rotor blade array susceptible to an aerodynamic instability similar to the instability which closure of the hybrid vanes was intended to prevent.

This shortcoming can, of course, be overcome by reducing the difference in the quantity of air channeled to the core unit in each of the two modes. A reduction in the difference may make it possible to identify an orientation of the hybrid vanes that offers an acceptable incidence angle as well as adequate flow capacity in the low mode. However reducing the difference in the airflow quantities is tantamount to reducing the differences in the corresponding thermodynamic cycles and results in a reduction or elimination of the benefits of cycle variability. As discussed above, the complexity and cost of a variable cycle engine can only be justified if the potential benefits of cycle variability are realized.

DISCLOSURE OF THE INVENTION

It is, therefore, an object of the invention to provide a variable cycle engine of the type described having at least two operational modes each of which exhibits aerodynamic stability and whose corresponding thermodynamic cycles are sufficiently different to outweigh the disadvantages of cycle variability.

According to the invention a variable cycle engine, operable in at least two modes which channel different quantities of air to a hybrid stage, includes bivariable vanes in the stator vane array of the hybrid stage. Each bivariable vane has a leading segment and a trailing segment and each segment is separately adjustable over its own range of pitch angles. The separate adjustability of the segments satisfies the conflicting requirements of orienting the vane to maintain a stable incidence angle while not changing the vane array flow capacity out of proportion to the actual airflow quantity difference between the modes.

In one embodiment of the invention, the range of angles over which the leading segment must be adjusted is minimized by locating the compressor bypass port upstream of the hybrid stage stator vane array.

The primary advantage of the invention is its ability to exploit cycle variability to achieve optimum operation over a large portion of the engine operating envelope without compromising engine stability.

The foregoing features and advantage and the operation of the invention will become more apparent in light of the following description of the best mode for carrying out the invention and the accompanying drawings.

BEST MODE FOR CARRYING OUT THE INVENTION

Figure 1:
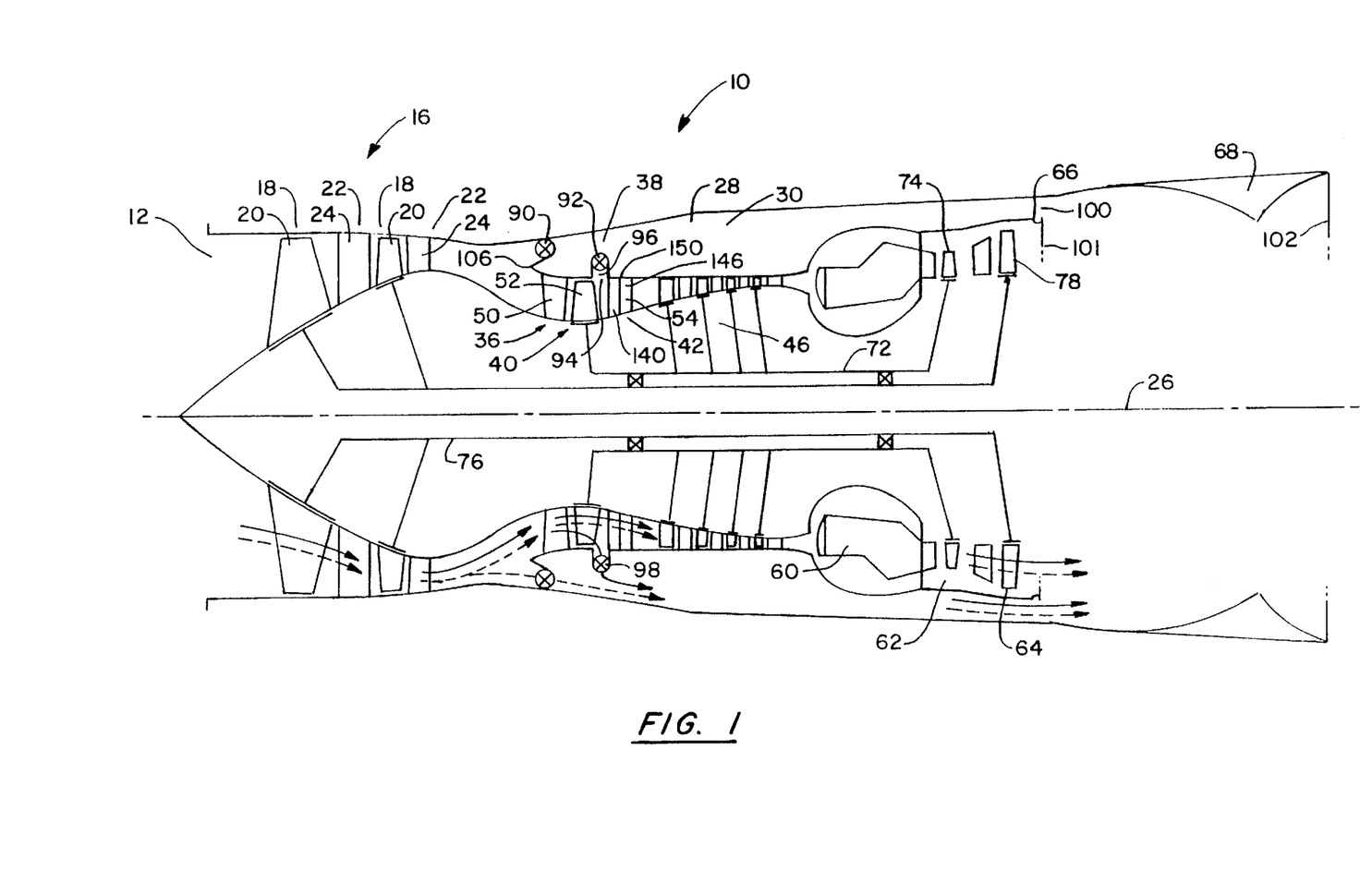
FIG. 1 is a schematic side view of a variable cycle gas turbine engine having a hybrid stage stator vane array with bivariable vanes.

Referring to FIG. 1, a variable cycle gas turbine engine 10 has an intake 12, for admitting a working medium such as air into the engine, a fan section 16 with at least one fan blade array 18 comprised of circumferentially distributed fan blades 20 and at least one fan stator vane array 22 comprised of circumferentially distributed fan stator vanes 24. The fan blade arrays are rotatable about a central axis 26. The engine also includes a fan duct 28 and a core unit 30 in series flow relationship with the fan and in parallel flow relationship with each other. The core unit includes a guide vane array 36, a hybrid stage 38 having a hybrid rotor blade array 40 and a hybrid stator vane array 42, and a compressor 46 having at least one rotor blade array. The core unit blade and vane arrays, like those of the fan, are comprised of individual blades and vanes such as guide vane 50, hybrid rotor blade 52 and hybrid stator vane 54, and the blade arrays are rotatable about the central axis 26.

The hybrid stage referred to in the above description is so named because of its similarity to both a core unit stage and a fan stage. The hybrid rotor blade array rotates at the same speed as the core compressor and is in series flow communication, across its entire span, with the compressor. In these respects the stage is similar to a core stage. However in one mode of engine operation, all of the working medium air admitted into the engine by the intake is channeled to the hybrid stage. In this respect, the stage resembles a fan stage since a true core stage in a turbofan gas turbine engine receives only a portion of the air admitted by the engine intake.

Other components of the engine include a combustor 60, high pressure turbine 62, low pressure turbine 64, internal variable area exhaust nozzle 66 and external variable area exhaust nozzle 68. High speed shaft 72 joins the blade array 74 of the high pressure turbine to the blade arrays of the compressor and hybrid stage while concentric low speed shaft 76 joins the low pressure turbine blade array 78 to the fan blade array 18. During engine operation, the turbines rotate about the central axis to rotatably drive the fan blade, hybrid rotor blade and compressor rotor blade arrays. The high speed shaft and its associated blade arrays rotate at a higher angular velocity than the low speed shaft and its associated blade arrays.

The engine also includes internal valves for redirecting the flow of air within the engine. Fan duct bypass valve 90, located downstream of the fan, governs flow communication between the fan and the fan duct. Any suitable valve and valve actuating arrangement may be used. For example, the valve may comprise a series of circumferentially distributed hinged doors which pivot outward to an open position to establish flow communication between the fan and the fan duct or inward to a closed position to block flow communication. Pivoting of the doors may be effected by one or more actuators which cause the axial translation of a unison ring which, in turn, is connected to each door by a suitable linkage arrangement. A compressor bypass valve 92 controls the flow of air through compressor bypass port 94 and bypass duct 96 to selectively establish flow communication between the core unit and the fan duct. The bypass port is located downstream of the hybrid rotor array and upstream of the compressor. As with the fan duct bypass valve, any suitable valve and actuating arrangement may be used. For example, the valve may be a ring which is rotated circumferentially to an open position to expose discreet, circumferentially distributed discharge openings at the terminus 98 of the bypass duct 96, or which is rotated to a closed position to block the discharge openings.

The engine has two modes of operation in which the quantity of air (usually expressed in mass flow per unit time) channeled to the core unit differ from each other. The engine's operational mode is determined, in part, by the positions of the bypass valves and each mode corresponds to a distinct thermodynamic cycle.

In one mode of operation, referred to as the high fan pressure ratio mode, or simply high mode, the fan bypass valve is closed and the compressor bypass valve is open. In addition, the variable area nozzles 66, 68 are each automatically adjusted to minimize the flow areas at fan duct and engine discharge planes 100, 102 respectively. Working medium air, as indicated by the solid arrows, is admitted into the engine through the intake 12 and flows through the fan 16 where the fan duct bypass valve 90 blocks its entry into the fan duct. The air is therefore channeled into the core unit and flows through the guide vane array 36 and through at least the hybrid stage rotor blade array 40. Because the compressor bypass valve is open, a portion of the air flows through the bypass duct 96 and into the fan duct while the remainder of the air proceeds through the core compressor, combustor and turbines. The streams of air are reunited and mixed immediately downstream of the fan duct and core unit discharge planes 100, 101 and the reunited streams are discharged from the engine at the engine discharge plane 102. The high mode produces a high level of thrust at the expense of rapid fuel consumption and significantly elevated internal temperatures which cause accelerated deterioration of engine components. This mode may be suitable for military aircraft which require brief bursts of power for short runway takeoffs or combat maneuvering.

In another mode of operation, referred to as the low fan pressure ratio mode, or simply low mode, the fan bypass valve is open and the compressor bypass valve is closed. In addition, the variable area nozzles 66, 68 are each automatically adjusted to maximize the flow areas at fan duct and engine discharge planes 100, 102 respectively. The paths followed by the working medium air as it flows through the engine in the low mode are indicated by the broken arrows. As in the high mode, working medium air enters the engine through the intake and flows through the fan. Unlike the high mode, a bifurcation 106 splits the air discharged from the fan into parallel flowing coannular streams—an outer or secondary stream which flows through the fan duct and a coannular inner or primary stream which is channeled into the core unit. Since the compressor bypass valve is closed, the entire quantity of air in the inner stream passes through the hybrid stage and enters the compressor. The inner air stream flows through the compressor, combustor, and turbine and is reunited with the outer stream aft of the core unit and fan duct exhaust planes 100, 101. The reunited streams are discharged from the engine at the engine discharge plane 102. The low mode produces less thrust than the high mode but exposes the engine components to more modest internal temperatures and consumes significantly less fuel. The low mode, in contrast to the high mode, is suitable for long duration flights where range, endurance and economy of operation are more important than extreme speed and power.

In the low mode approximately 57% to 77% (nominally 67%) of the air drawn into the intake 12 is channeled to the core unit 30 with the remaining 23% to 43% (nominally 33%) entering the fan duct 28. In the high mode, 100% of the air drawn into the intake is channeled to the core unit and 16% to 36% (nominally 26%) of this air flows through bypass duct 96 and into the fan duct. Thus the high mode channels one and one half times as much air to the core unit as the low mode (100% divided by 67%=1.5). This difference in the quantity of air channeled to the core is directly related to the distinctness of the thermodynamic cycles corresponding to each mode and therefore contributes to satisfying conflicting operational requirements. Unfortunately, as the following discussion makes clear, the airflow quantity difference also compromises engine aerodynamic stability.

Figure 2A:
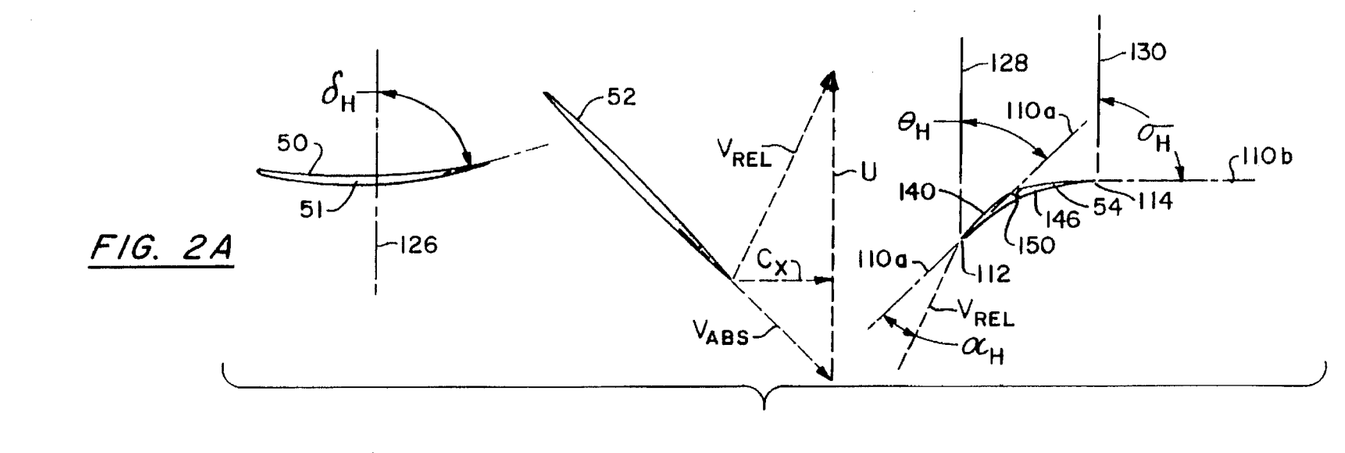
FIGS. 2a and 2b are schematic, radially inward looking views of a guide vane, a hybrid stage rotor blade and a hybrid stage stator vane of the engine of FIG. 1 comparing the operation of the bivariable vane in two modes of engine operation.
Figure 2B:
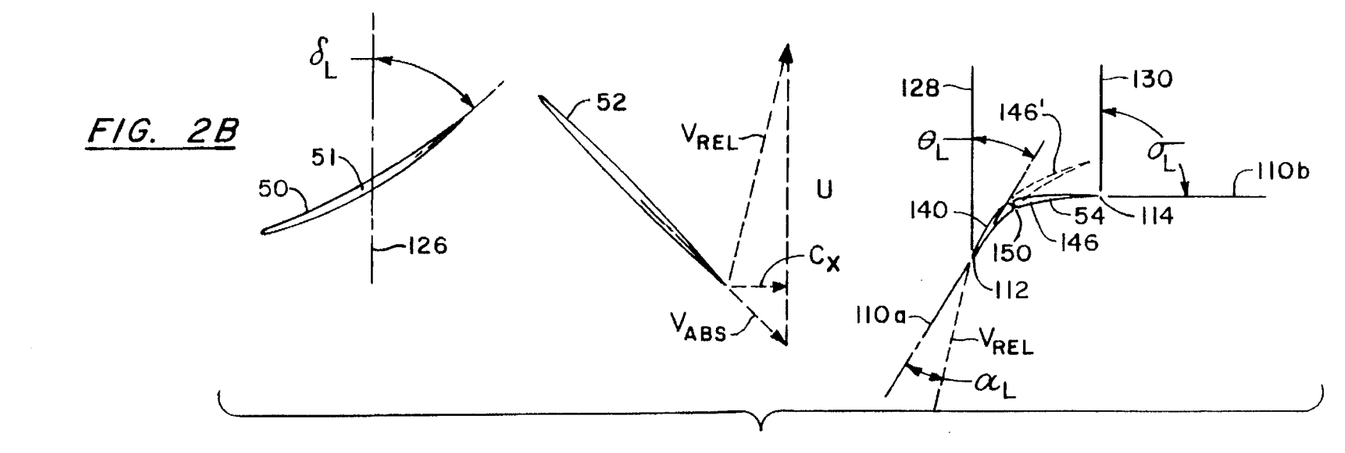

Referring now to FIGS. 2a and 2b a representative guide vane 50, hybrid stage rotor blade 52 and hybrid stage stator vane 54 are shown in the high mode (FIG. 2a) and low mode (FIG. 2b). Each guide vane and hybrid stator vane has a mean camber line which extends from the leading edge to the trailing edge midway between the vane's pressure and suction surfaces. For example, the hybrid vane, illustrated in greater detail in FIG. 3, has a mean camber line 110 extending from the leading edge 112 of the vane to the trailing edge 114, midway between the pressure and suction surfaces 116, 118. A leading edge extension 110a of the mean camber line is a straight line tangent to the mean camber line at the leading edge of the vane. Similarly, a trailing edge extension 110b of the mean camber line is tangent to the mean camber line at the trailing edge 114 of the vane. The extensions are a convenient reference for defining the pitch angle which, generally speaking is the angle between a circumferentially extending reference line such as 126, 128, 130 (FIG. 2) and a mean camber line extension such as 110a or 110b.

Referring again to FIGS. 2a and 2b, the guide vanes 50 are variable pitch vanes, that is, each vane is pivotable about a radial axis 51 so that the orientation of the vane is adjustable over a predetermined range of guide vane pitch angles $\delta$ (unsubscripted symbols refer to angles generally, while symbols carrying the L or H subscript refer to the angle in either the low or high mode). The hybrid stator vanes, as indicated by the representative vane 54, are bivariable. Each hybrid vane has a leading segment 140 and a trailing segment 146 hinged together at and pivotable about a radially extending hinge 150. The orientation of the leading segment is adjustable over a range of leading segment pitch angles $\theta$ for controlling the incidence angle $\alpha$ of the leading edge 112 relative to the local flow direction of the working medium. The orientation of the trailing segment 146 is separately adjustable over a range of trailing segment pitch angles $\sigma$. The mechanisms for adjusting the pitch angles are not embraced by the invention and therefore not shown.

During operation in the high mode (FIG. 2a) the guide vanes 50 are adjusted to an open pitch angle to accommodate the large quantity of air channeled into the core unit and to ensure that air is properly directed to the hybrid rotor blades 52. The working medium air flows through the hybrid rotor blade array and exits the blade array with an axial velocity component $C_x$ and an absolute velocity component (i.e. in the frame of reference of the rotating blades) $V_{abs}$. Because the blades rotate about the engine centerline at velocity U, the air velocity relative to the leading edge of the hybrid stator vanes 54 is $V_{rel}$, the vector sum of $V_{abs}$ and U. As seen in the figure, the leading segment 140 of the hybrid stator vane 54 is adjusted to an open pitch angle $\theta_H$ so that the incidence angle $\alpha_H$ between the relative velocity vector and the mean camber line extension 110a is within a range that ensures aerodynamically stable operation of the vane. The trailing segment 146 is adjusted to a pitch angle $\sigma_H$ so that the flow area of the hybrid vane array is large enough to accommodate the quantity of air received by the hybrid vane array.

Referring to FIG. 2b, operation in the low mode is similar except that a reduced quantity of air is channeled into the core unit with a correspondingly reduced velocity. Accordingly, the guide vanes are adjusted to a more closed orientation ($\delta_L$ is less than $\delta_H$) which is compatible with the reduced air quantity and velocity. A comparison of FIG. 2b with 2a shows that the axial velocity $C_x$ is also lower. Since there is not a proportional reduction in the rotor blade velocity U, the relative velocity component $V_{rel}$ is more circumferentially directed in the low mode than in the high mode. Accordingly, the leading segment 140 of the hybrid rotor blade is adjusted to a more closed position (i.e. $\theta_L$ is less than $\theta_H$) so that the incidence angle $\alpha_L$ remains within the range of aerodynamic stability. If the leading segment had been left in the same orientation as in FIG. 2a, $\alpha_L$ would have been greater than $\alpha_H$ and the hybrid stator vane may have been susceptible to an aerodynamic stall.

As also seen in FIG. 2, the trailing segment 146 is separately adjusted to a more open position (i.e. $\sigma_L$ is greater than $\sigma_H$). Were it not for the bivariable character of the stator vane (i.e. separate adjustability of the leading and trailing segment orientations), the trailing segment would have undergone the same orientation change as the leading segment as illustrated by the phantom trailing segment 146'. As a consequence the flow area and therefore the flow capacity of the hybrid vane array would have been reduced by an amount greater than the actual flow quantity reduction associated with operation in the low mode (relative to the high mode). As a further consequences the air pressure downstream of the hybrid rotor blades would have become elevated and the blades would have been susceptible to an aerodynamic stall not unlike that which the closure of the hybrid vanes was intended to avoid. By contrast, bivariable stators according to the invention afford separate adjustability of the segments. The leading segment is adjustable to a more closed orientation (in the low mode relative to the high mode) to ensure the correct incidence angle at the leading edge while the trailing segment is adjustable to a more open orientation to regulate the flow capacity of the hybrid vane array.

The relative orientation of the leading and trailing portions also has an effect on stability. If the portions are oriented so that the camber or curvature of the hybrid vane is excessive, airflow will separate off the suction surface of the vane, resulting in aerodynamic instability. The amount of tolerable camber depends on the aerodynamic characteristics of a specific design and therefore must be evaluated on a case by case basis.

Figure 3:
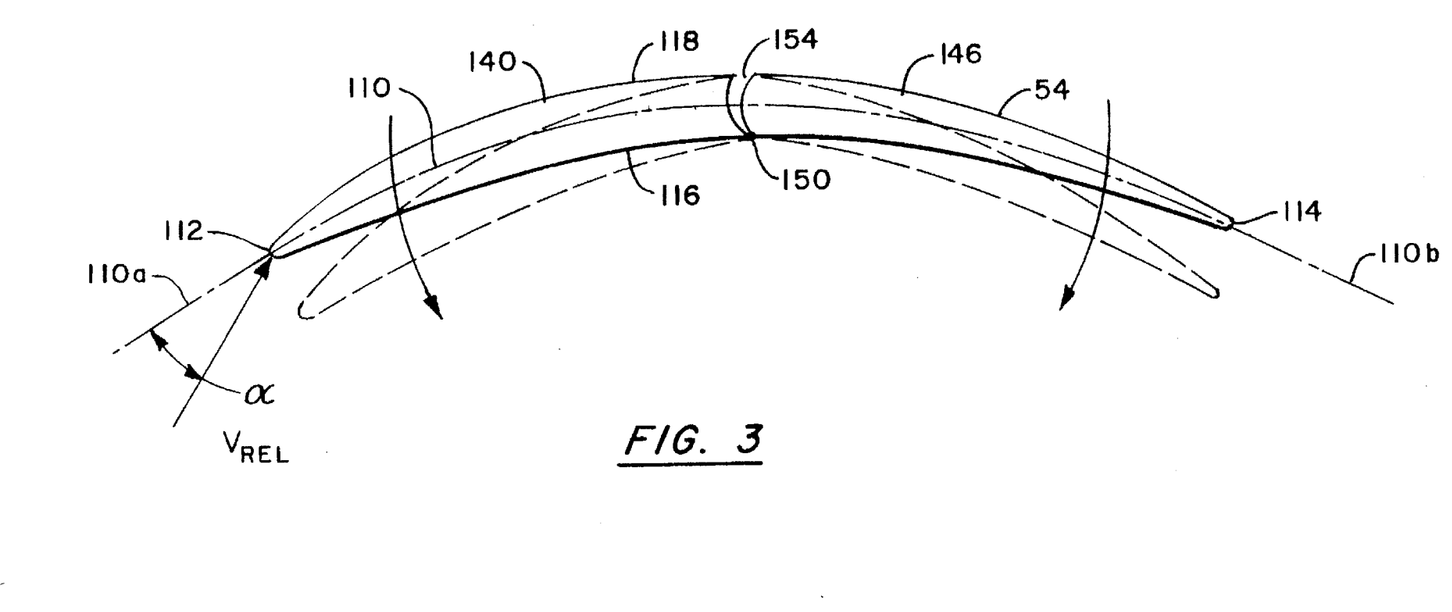
FIG. 3 is an enlarged schematic view of the bivariable vane of FIG. 2.

As seen in FIG. 3, the pivoting of the hybrid vane segments about hinge 150 expands or contracts a gap 154 along the suction surface 18. A flexible seal may be installed across the gap to provide continuity between the leading and trailing segments on the suction surface 118. However such a seal may not long survive the rigors of engine operation. In the event that such a seal fails, or is not installed due to the high likelihood of failure, the gap disrupts the continuity and smoothness of the suction surface. If the width of the gap is small, the aerodynamic performance of the airfoil may not be noticeably poorer than the performance of a perfectly continuous airfoil. A large gap, as occurs if the leading segment is pivoted closed (counterclockwise in the Figure) and the trailing segment is pivoted open (clockwise in the Figure), increases the likelihood that aerodynamic performance will be compromised. Therefore, it is advisable to minimize the combined orientation change of the leading and trailing segments. Other factors may also motivate minimization of the combined orientation change. For example, reduced angular changes may help minimize the length of actuator links thereby reducing engine weight.

Figure 4A:
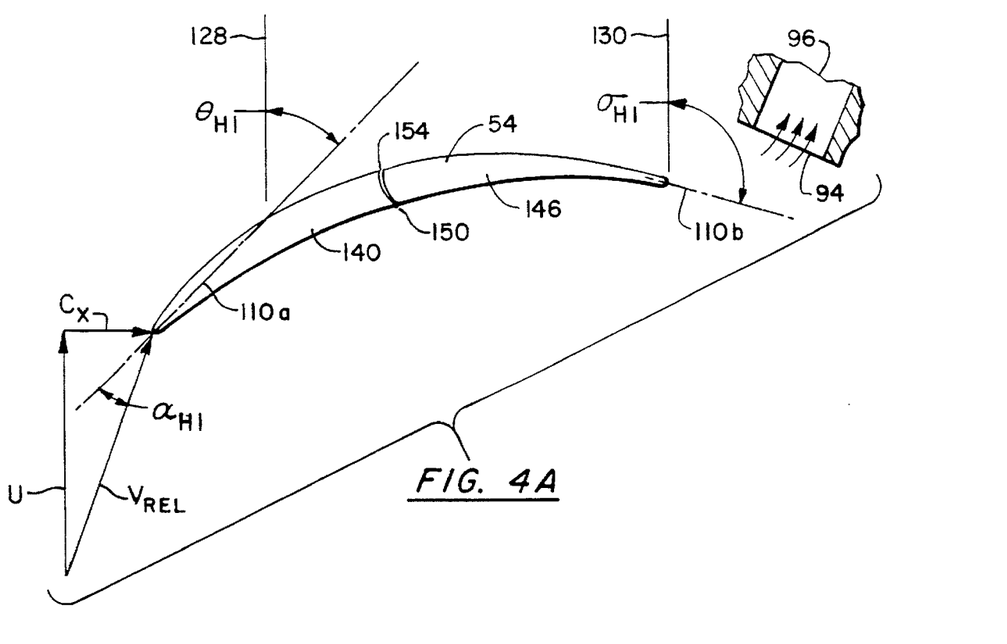
FIGS. 4a and 4b are radially inward looking views of the bivariable vane of FIG. 1 showing the effect that locating a compressor bypass port downstream of the hybrid stage stator vane array has on the pitch angle adjustments to the bivariable vane.

In one embodiment of the invention, the combined angular change is minimized by locating the compressor bypass port 94 (FIG. 1) upstream rather than downstream of the of the hybrid stator vane array. The effect of compressor bypass port location is demonstrated in FIGS. 4a, 4b, 5a and 5b. FIG. 4a shows operation in the high mode with the compressor bypass port 94 located downstream of the hybrid stator vane 54. The leading segment 140 is oriented at pitch angle $\theta_{H1}$ to achieve an aerodynamically stable leading edge incidence angle $\alpha_{H1}$. FIG. 5a also shows high mode operation, but with the compressor bypass port 94 located upstream of the hybrid vanes so that a portion of the air is diverted through the bypass port and into the fan duct prior to reaching the hybrid vane. The reduced quantity of air received by the hybrid vane has a correspondingly reduced axial velocity, $C_x$ and a more circumferentially directed relative velocity $V_{rel}$. In order to maintain a stable incidence angle $\alpha_{H2}$, ($\alpha_{H2}$ in FIG. 5a is equal to $\alpha_{H1}$ in FIG. 4a) the leading segment is adjusted to a pitch angle $\theta_{H2}$ which is more closed than pitch angle $\theta_{H1}$.

Figure 4B:
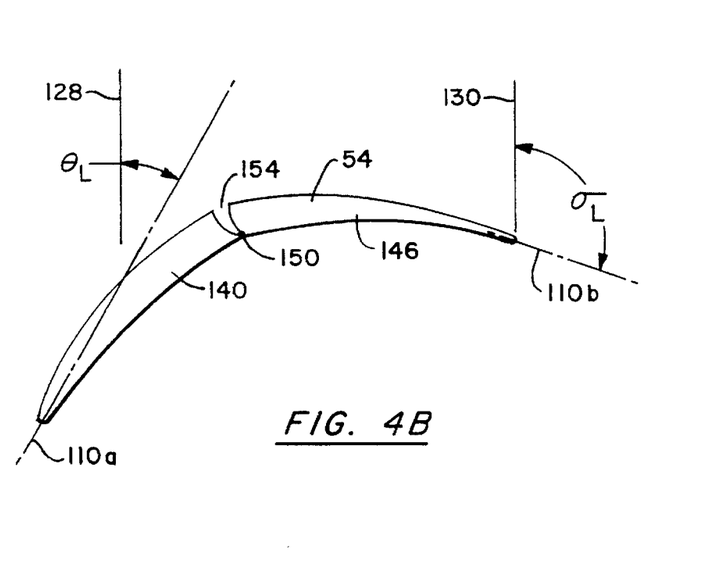
Figure 5A:
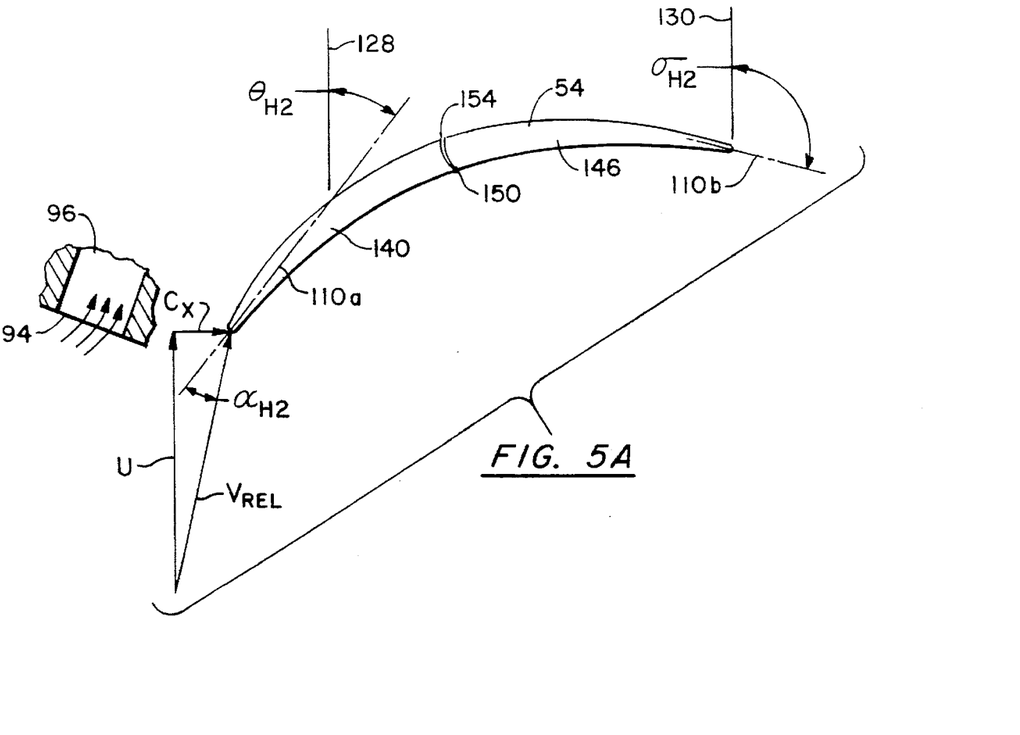
FIGS. 5a and 5b are radially inward looking views of the bivariable vane of FIG. 1 showing the effect that locating a compressor bypass port upstream of the hybrid stage stator vane array has on the pitch angle adjustments to the bivariable vane.
Figure 5B:
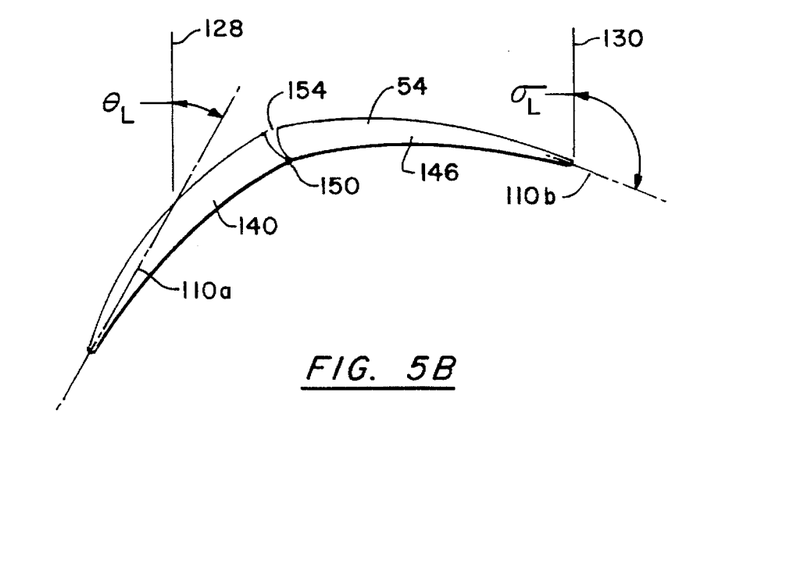

Referring now to FIGS. 4b and 5b, which show operation in the low mode, the leading segment is oriented at a pitch angle $\theta_L$ which is independent of the location of the compressor bypass port since no air is diverted through the port in the low mode. Clearly, the angular change from $\theta_{H2}$ to $\theta_L$ is less than the angular change from $\theta_{H1}$ to $\theta_L$ since $\theta_{H2}$ is more closed than $\theta_{H1}$. Accordingly the gap 154 of FIG. 5b is smaller than the gap 154 of FIG. 5a leading to improved aerodynamic performance.

Although the invention has been described in the context of a bimodal variable cycle engine, it is applicable to engines having more than two modes and to other types of bimodal engines for both commercial and military applications, provided that two of the engine's operational modes channel different quantities of air to the core unit. Moreover, the scope of the invention is not limited to the specific bivariable stator design disclosed and illustrated.

We claim:

1. A variable cycle gas turbine engine having:

an engine intake for admitting a working medium into the engine;

a fan downstream of the intake having at least one fan blade array rotatable about a central axis;

a fan duct downstream of the fan;

a core unit also downstream of the fan and in parallel flow relationship with the fan duct, the core unit comprising, in series flow relationship:

a guide vane array;

a hybrid stage having a rotor blade array and a stator vane array; and, a core compressor having at least one rotor blade array, the hybrid and compressor rotor blade arrays being rotatable about the central axis at a common rotational speed;

a fan duct bypass valve for governing flow communication between the fan and the fan duct;

a compressor bypass port upstream of the compressor for selectively establishing flow communication between the core unit and the fan duct; and, a compressor bypass valve for controlling working medium flow through the bypass port, the fan duct and compressor bypass valves each having a closed position and an open position, the engine being operable in at least two modes determined by the positions of the valves such that the mass flow rate of the working medium channeled into the core unit in one of the modes exceeds that channeled into the core unit in the other of the modes, the engine characterized in that each vane in the hybrid stator vane array has a leading segment with a leading edge and a trailing segment with a trailing edge, and the orientation of the leading segment is adjustable over a range of leading segment pitch angles for regulating the incidence angle of the leading edge relative to the working medium, and the orientation of the trailing segment is separately adjustable over a range of trailing segment pitch angles for controlling the mass flow capacity of the hybrid vane array.

2. The engine of claim 1 characterized in that the discharge port is located upstream of the hybrid stage stator vane array.

3. The engine of claim 1 characterized in that each vane of the hybrid stage stator vane array has a pressure surface and a suction surface, each surface extending from the leading edge to the trailing edge, the pressure surface being hinged intermediate the leading and trailing edges to enable separate adjustability of the leading and trailing segments.

4. The engine of claim 1 characterized in that one of the modes is a high mode defined by the fan duct bypass valve being closed and the compressor bypass valve being open and the other of the modes is a low mode defined by the fan duct bypass valve being open and the compressor bypass valve being closed.

5. The engine of claim 4 characterized in that the leading segment pitch angle is more closed in the low mode than in the high mode and the trailing segment pitch angle is more open in the low mode than in the high mode.

6. The engine of claim 4 characterized in that the mass flow rate of the working medium channeled into the core unit in the low mode is in the range of 57 to 77 percent of the mass flow rate entering the engine through the engine intake.

7. The engine of claim 4 characterized in that the mass flow rate of the working medium bypassed into the fan duct in the high mode is in the range of 16 to 36 percent of the mass flow rate entering the engine through the engine intake.

* * * * *